(12) United States Patent
Pinkas

(10) Patent No.: US 6,968,060 B1
(45) Date of Patent: Nov. 22, 2005

(54) METHOD FOR VERIFYING THE USE OF PUBLIC KEYS GENERATED BY AN ON-BOARD SYSTEM

(75) Inventor: Denis Pinkas, Chaville (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/673,137

(22) PCT Filed: Feb. 10, 2000

(86) PCT No.: PCT/FR00/00332

§ 371 (c)(1),
(2), (4) Date: Oct. 11, 2000

(87) PCT Pub. No.: WO00/48355

PCT Pub. Date: Aug. 17, 2000

(30) Foreign Application Priority Data

Feb. 11, 1999 (FR) ................... 99 01652

(51) Int. Cl.[7] .............................. H04L 9/00
(52) U.S. Cl. .............. 380/277; 380/44; 380/279; 380/280; 713/176; 713/192
(58) Field of Search ................. 713/155–156, 713/168, 170, 175–176, 181, 192; 380/30, 380/44, 277, 279–280

(56) References Cited

U.S. PATENT DOCUMENTS

| | | | | |
|---|---|---|---|---|
| 4,944,007 A | * | 7/1990 | Austin | 713/180 |
| 5,164,988 A | * | 11/1992 | Matyas et al. | 713/156 |
| 5,586,186 A | * | 12/1996 | Yuval et al. | 380/30 |
| 6,041,704 A | * | 3/2000 | Pauschinger | 101/91 |
| 6,134,658 A | * | 10/2000 | Multerer et al. | 713/175 |

FOREIGN PATENT DOCUMENTS

EP 0 576 224 A 12/1993

OTHER PUBLICATIONS

Holloway C: "Controlling the Use of Cryptographic Keys" Proceedings Of Compsec International 1995, 12th World Conference on Computer Security, Audit and Control, London UK, 25-27 Oct. 1995, pp. 587-598; XP000584311, Oxford, UK, Elsevier, UK ISBN: 1-85617-294-5; p. 590, col. 1, last par. p. 597.

Matyas S M: "Key Handling with Control Vectors" IBM Systems Journal, 1991, USA, vol. 30, No. 2, pp. 151-174, XP000234622 ISSN: 0018-8670 p. 162 - p. 163, p. 169.

* cited by examiner

*Primary Examiner*—Gilberto Barron
*Assistant Examiner*—Minh Dinh
(74) *Attorney, Agent, or Firm*—Miles & Stockbridge P.C.; Edward J. Kondracki

(57) ABSTRACT

For a set (Lk) of embedded systems, an authorized operator with identifier ($OP_j$) creates a mother public key (KpM) and a mother private key (KsM). The identifier ($OP_j$), the range of identifiers referenced (Lk) and the mother public key (KpM) are published. For each embedded system ($SN_i$), a diversified key ($KsM_i$) is created from the identifier ($SN_i$) and stored. For every public key (Kp) generated by an embedded system, a cryptographic control value ($Sc_i$) is calculated on the public key (Kp), an algorithm identifier (CA1) and the utilization parameters (U) of this key, using a zero knowledge signature algorithm, and a certification request message (MRCA) that includes control value ($Sc_i$), the identifier of the operator ($Op_j$), and identifier ($SN_i$) is transmitted to a certification authority, which retrieves the identifier ($Op_j$) and the value of the mother public key (KpM).

6 Claims, 6 Drawing Sheets

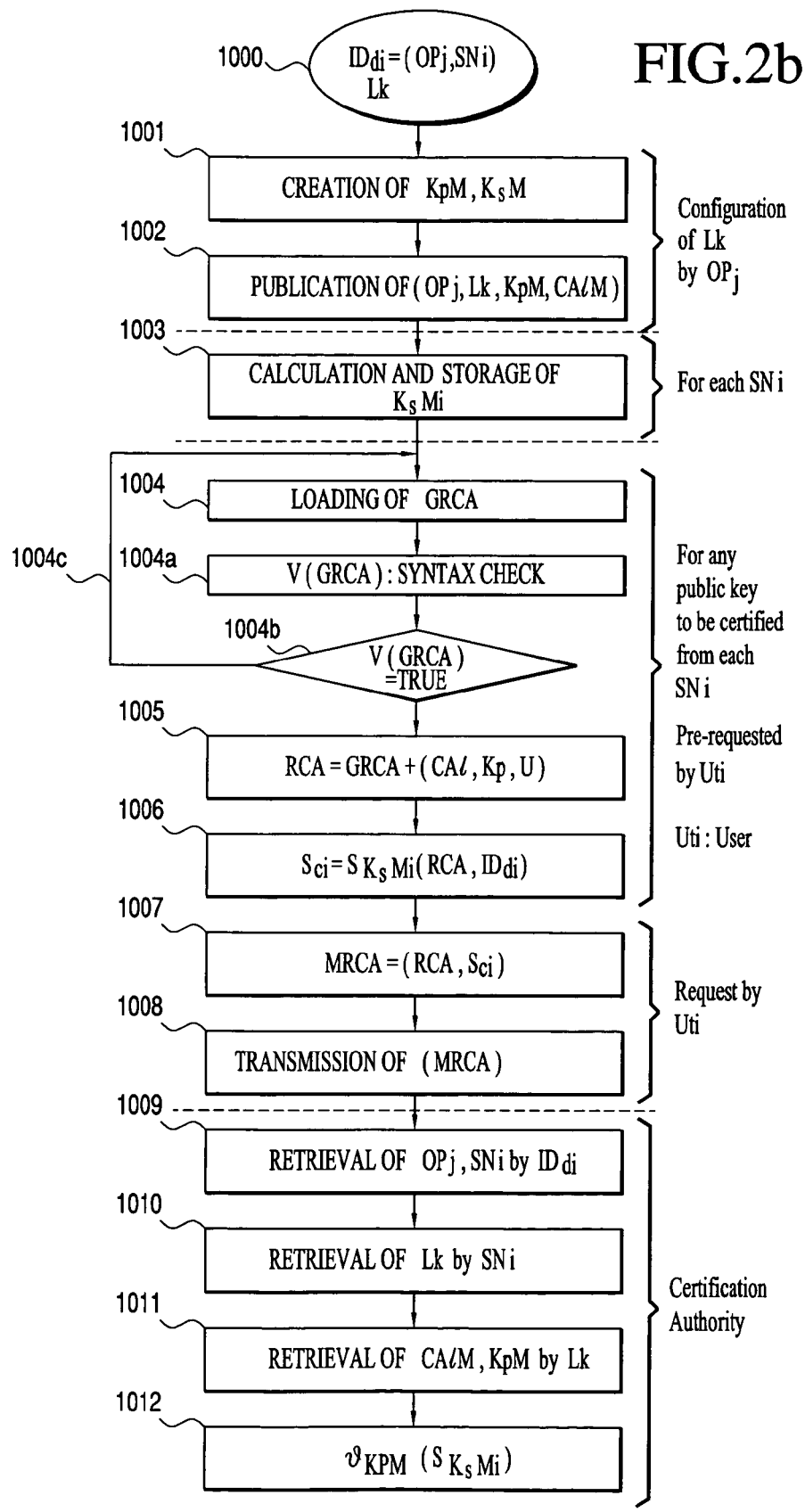

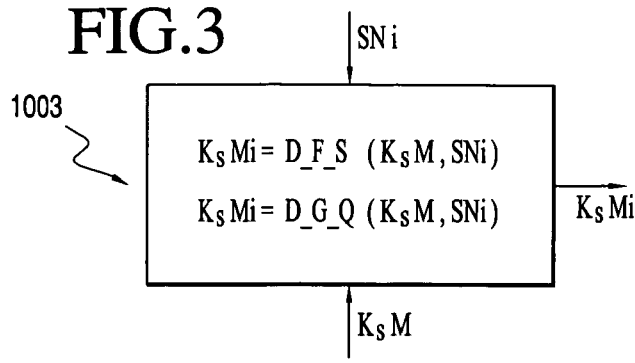
FIG.3
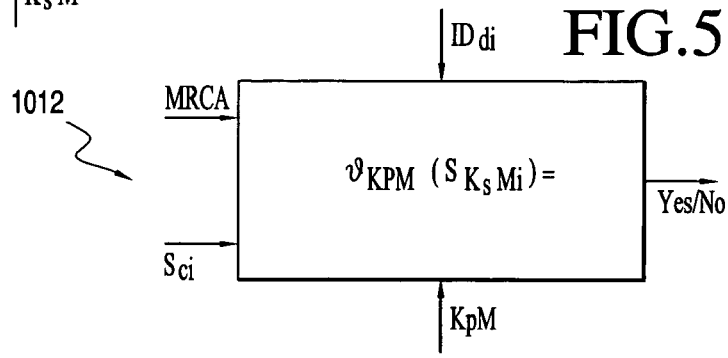
FIG.5
FIG.6
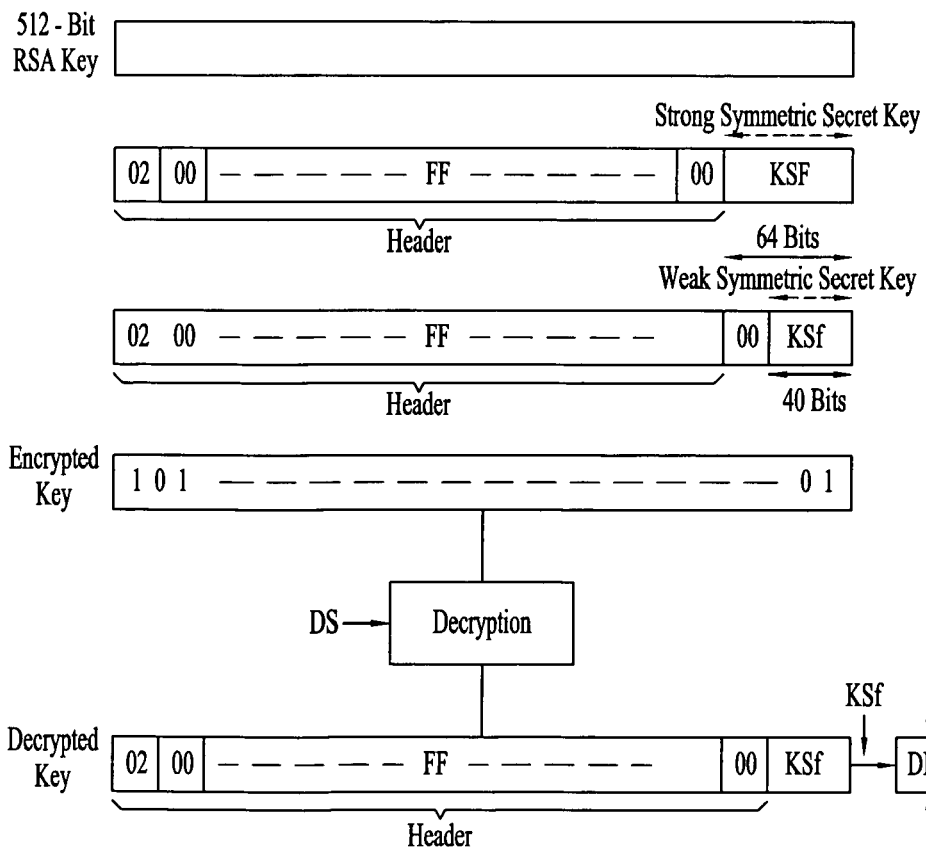

METHOD FOR VERIFYING THE USE OF PUBLIC KEYS GENERATED BY AN ON-BOARD SYSTEM

FIELD OF THE INVENTION

The invention relates to a method for verifying, in particular, the usage of public keys generated by an embedded system, and the corresponding on board or embedded system.

DESCRIPTION OF RELATED ART

To guarantee the transmission security of the data transmitted though computer networks, the users of these networks have expressed a strong demand for provisions for the encryption/decryption or the digital signature generation/verification of this transmitted data.

The purpose of encryption/decryption operations is to encode, then decode, transmitted messages using a secret convention temporarily shared between a sender and a receiver, in order to make them unintelligible to outsiders to this convention.

The purpose of signature operations is to transmit specific messages that make it possible to guarantee the integrity and the source of the transmitted data.

For reasons of public safety, government authorities in certain countries have established restrictive legislative provisions in order to impose strict regulations on encryption/decryption operations using so-called "strong" algorithms. However, other operations such as encryption/decryption using so-called "weak" algorithms, authentication, integrity and non-repudiation using a digital signature calculation are not subject to such restrictive measures. In particular, the information message accompanying a digital signature, being transmitted in unencrypted form, may be subject to any usable police examination.

Various systems of digital signature calculation have been proposed to date.

Among these, the cryptographic systems that use asymmetric keys have been more widely used because of the flexibility of their utilization, or at least the relative flexibility of their management of the aforementioned keys. In essence, these systems use a private, unpublished key and a public key. Knowledge of the public key does not make it possible to calculate the private key.

Certain digital signature algorithms cannot be used for any usage other than digital signature. This is the case with the system known as DSA (Digital Signature Algorithm). However, there is another widely used algorithm known as DSA, named for its inventors Rivest, Shamir and Adleman, which allows the use of both digital signature calculation and so-called "strong" encryption/decryption operations.

SUMMARY OF THE INVENTION

One of the objects of the present invention, in connection with the use of an asymmetric key cryptographic system, is to make sure that an embedded system using the RSA algorithm and RSA keys to be used only for digital signature is capable of supporting signature operations from said keys only and not decryption operations.

Another object of the present invention is to implement a public key infrastructure usable exclusively for digital signature purposes. In essence, if a user tried to use for encryption purposes one of the RSA public keys certified for signature purposes, the entity in possession of the corresponding RSA private key would be completely incapable of decrypting it using said private key.

Another object of the present invention is a to provide method for verifying a request to certify a public key generated by an embedded system that allows a certification authority to control the use of this key for purposes of limited decryption operations.

Finally, another object of the present invention, in connection with the aforementioned control of the use of this key, is to limit this use to encryption/decryption operations by means of "weak" symmetric algorithms authorized by certain government authorities.

It will be recalled that of embedded systems are generally constituted by a microprocessor card and made available to an entity.

The aforementioned notion of an entity covers either the physical person in possession of an embedded system such as a microprocessor card, or any computer system equipped with a comparable embedded system or microprocessor card.

The method for verifying the source of the request to certify a public key of a pair of asymmetric keys, a public key Kp and a private key Ks, generated for a given algorithm CA1 and a given usage, such as encryption/decryption or digital signature verification/generation, by an embedded system and stored in the storage area of an embedded system Si equipped with cryptographic calculation means and externally accessible read/write-protected means for storing digital data, this digital data $IDd_i$ comprising at least a serial number $SN_i$ for identifying the embedded system and an identification code $OP_j$ of an operator authorized to configure said embedded system, this request being formulated by said embedded system by transmitting a request message MRCA containing said public key Kp to a certification authority CA, is remarkable in that it consists, prior to any transmission of a certification request, during the configuration of these embedded systems by this authorized operator, for all the embedded systems Si of a set Lk of embedded systems:

- of having this authorized operator generate, for this given set of embedded systems, a mother public key KpM and a mother private key KsM;
- of publishing said mother public key KpM associated with the identity of this authorized operator $OP_j$ and with this set Lk of embedded systems; and for each embedded system belonging to the range of identifiers defined by this set Lk of embedded systems:
- of having this authorized operator generate, from said mother private key KsM and from the serial number $SN_i$ of the embedded system, a diversified private key $KsM_i$ and of storing said diversified private key $KsM_i$, in said externally accessible read/write-protected storage area, and prior to any transmission of a certification request,
- of having the embedded system generate a certification request RCA containing, in particular, a public key field CA1,Kp and the usage indicators U of this public key;
- of having the embedded system generate, using said calculation means and said diversified key $KsM_i$ associated with this embedded system, a cryptographic control value $Sc_i$ on the entire request RCA, this cryptographic control value being a digital signature calculated by means of the diversified private key $KsM_i$; and when a certification request is sent to the certification authority by the embedded system:
- of forming a certification request message MRCA containing the request RCA, the identifier $IDd_i$ of the embedded system, the latter being constituted by the identifier $OP_j$ of this authorized operator and by the serial number $SN_i$ of the embedded system, and the cryptographic control value SCi;

of transmitting to the certification authority CA said request message MRCA formed during the preceding step and containing the public key fields CA1, Kp and the usage indicators U subject to said certification, and said cryptographic control value $Sc_i$;

when a certification request message MCRA is received by the certification authority, of retrieving the identity of the authorized operator $OP_j$ from the identifier $IDd_i$ of the embedded system, of retrieving, from the identifier $OP_j$ of the authorized operator, the value of the mother public key KpM associated with the set Lk to which the embedded system belongs;

of verifying, from said mother public key KpM, from said serial number $SN_i$ of the embedded system, and from said certification request message MRCA received, said cryptographic control value $SC_i$, which makes it possible to establish the authenticity of this cryptographic control value and the source of this certification request.

The method for verifying a key certification request generated by an embedded system, which is the subject of the invention, applies to any type of embedded system, but particularly to large numbers of embedded systems, each constituted by a microprocessor card or the like.

BRIEF DESCRIPTION OF THE DRAWINGS

It will be more clearly understood through the reading of the description and the examination of the drawings below in which, in addition to FIG. 1 related to an embedded system constituted by a standard microprocessor card.

FIG. 2b represents, by way of a non-limiting example, a flow chart of a variant of implementation of the method that is the subject of the present invention, as represented in FIG. 2a, in which a check of the syntax of a certification request template supplied to the embedded system is performed by the embedded system, prior to the generation of said certification request;

FIG. 3 represents, in the form of a functional diagram, a detail of the step of the method implemented as illustrated in FIG. 2a or 2b, in which a diversified private key is calculated for each embedded system;

FIG. 4a represents, by way of a non-limiting example, the structure of a certification request message in a simplified version, which makes it possible to implement the method that is the subject of the invention as represented in FIG. 2a;

FIG. 5 represents, in the form of a functional diagram, a detail of the step of the method implemented as illustrated in FIG. 2a or 2b, in which a verification of the request message is performed by the certification authority;

FIG. 6 represents a particularly advantageous variant of implementation of the method that is the subject of the present invention, in which a symmetric key for weak encryption/decryption is associated with the private key associated with a public key subject to a certification request, the corresponding embedded system thus being provided with a weak encryption/decryption function that meets all the legal requirements in force in certain countries so that these systems can be marketed without prior authorization;

DESCRIPTION OF THE PREFERRED EMBODIMENT(S)

Figure 1:
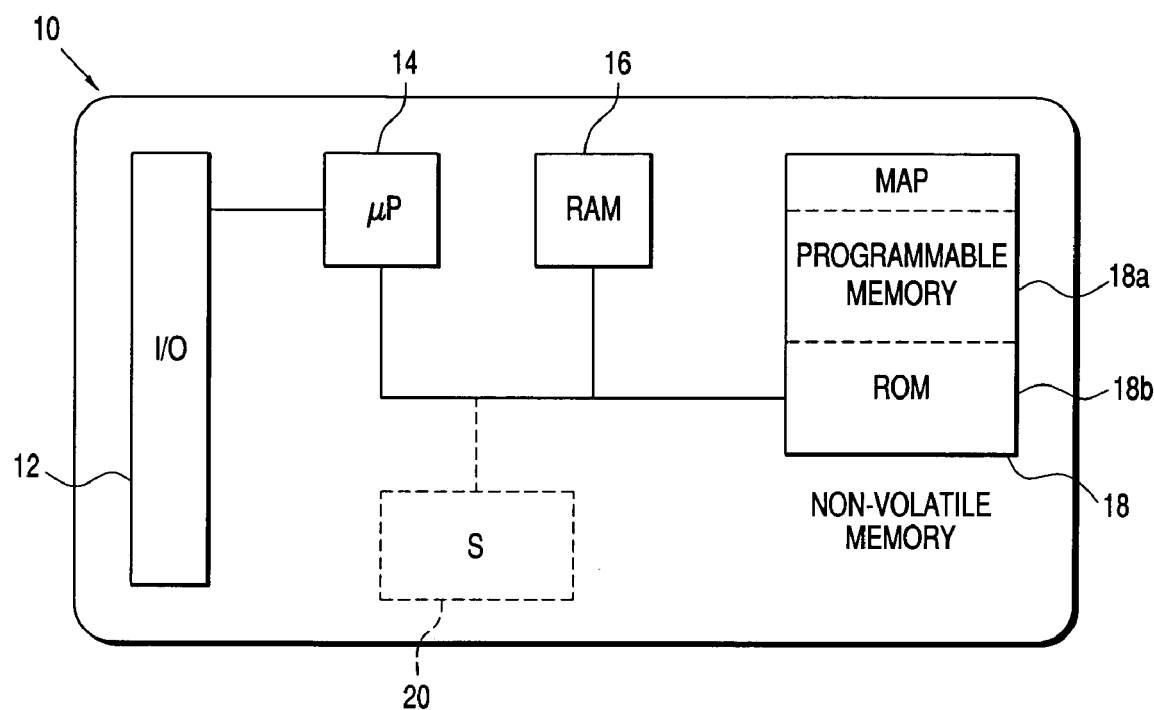

A more detailed description of the method for verifying the public key certification request according to the subject of the present invention will now be given in connection with FIGS. 2a, 2b and the subsequent figures.

Prior to the detailed description of the steps required to implement the method in connection with the aforementioned figures, general considerations for illustrating the context for the use of the method that is the subject of the present invention will be given below.

Generally, the method that is the subject of the present invention makes it possible to perform a verification of a public key certification request generated by an embedded system, this verification specifically including a verification of the source of this request, but also makes it possible, as a result of the verification thus performed and the certainty of the source of this request thus obtained, to be certain that the private key corresponding to the public key generated that is the subject of the present certification request can only be used for clearly specified uses such as digital signature generation or the decryption of weak symmetric keys.

A public key being, as the name indicates, public, it is not possible to limit the use of these keys for encryption. However with private keys being necessarily protected, the protection method used may be able to prevent RSA private keys from being used for decryption purposes. Therefore, while the encryption operation cannot be prevented, the decryption operation can be, and thus the encryption/decryption process is impossible. The method used is based on the fact it is possible to guarantee that the private key corresponding to a given public key cannot be used for decryption purposes and on the fact that it is possible to be sure that it is effectively contained in a protected embedded system that prevents it from being used for decryption purposes.

To make sure that a given key is attached to a given entity, a key certification technique is currently widely used. This technique consists of having a Certification Authority CA generate a public key certificate that associates with a given entity name a public key algorithm identifier CA1 and a public key value Kp for given usages U, for a given validity period. One example of such a certificate is known as an X0.509 certificate, named for the corresponding standard of the ITU (International Telecommunications Union), which standardized it.

In order to be able to participate in an architecture that supports public keys, it is necessary to be able to obtain a public key certificate. To do this, it is necessary to formulate a request that includes the information the requester wishes to have appear in his certificate. This request specifically includes the identifier of the algorithm used CA1, the value of the public key Kp for this algorithm and the usages of this key U. If the request emanates directly from the entity, it is impossible to know the protections implemented for the corresponding private key. However, if the request emanates directly from a protected embedded system that prevents the private key from being used for decryption purposes, then it is possible to be sure that the private key corresponding to the public key that is the subject of a certification request can only be usable for the usages indicated, for example for signature generation or weak decryption purposes. This is one of the objects of the method that is the subject of the present invention, which will be described in detail below in connection with FIGS. 2a and 2b.

The method that is the subject of the present invention will be described in the non-limiting case in which the embedded system is constituted by a microprocessor card such as a bankcard, a PCMCIA card or the like.

Conventionally, as represented in FIG. 1, a microprocessor card 10 comprises an input/output system 12 connected a microprocessor 14, a RAM 16, a nonvolatile memory 18 constituted by a ROM 18b and a programmable memory 18a. All of these elements are connected to the microprocessor 14 by a link through BUS. A module 20 for the cryptographic calculation of data is also added. The nonvolatile memory 18 normally includes a read/write-protected storage area, marked MAP, access to this area being reserved for the microprocessor 14 only, for purely internal utilization purposes.

Referring to FIG. 1, it is noted that in a microprocessor card of this type, the cryptographic calculation module can contain programs for signature generation or verification, or for encryption/decryption implemented by means of so-called "strong" processes supported by the RSA algorithm for example, as well as so-called "weak" processes supported by algorithms such as DES limited to 40-bit key sizes, for example.

Figure 2A:
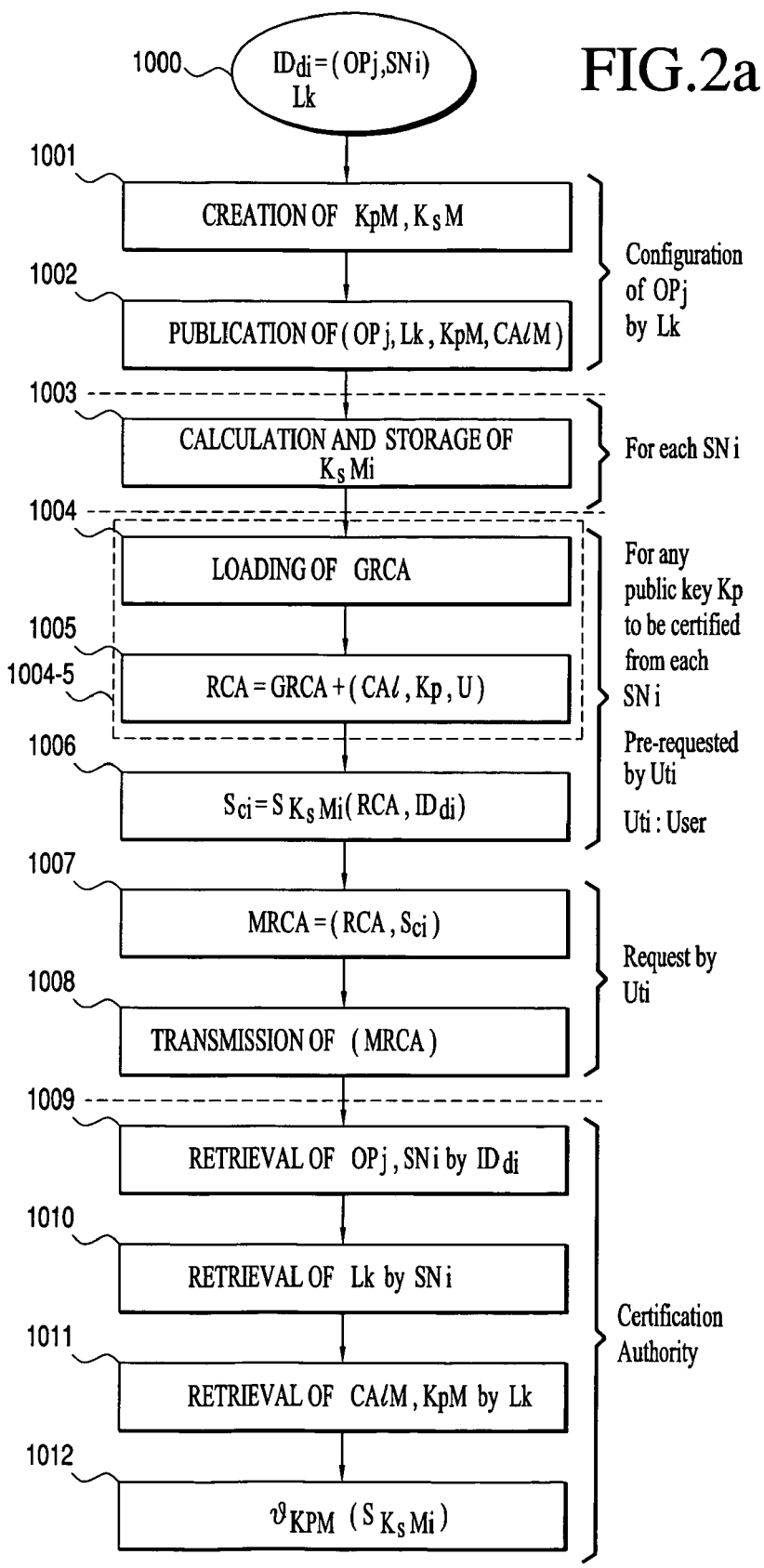
FIG. 2a represents, by way of a non-limiting example, a flow chart of all the operations or steps that make it possible to implement the method that is the subject of the present invention, i.e. the verification of the certification request generated by the embedded system.

According to FIG. 2a, an authorized operator identified by an identifier $OP_j$ is capable, in step 1000, of performing a configuration of a set of embedded systems, this set being marked Lk. In a practical way, it is noted that this set corresponds to a batch of embedded systems, such as microprocessor cards for example, that this operator wishes to distribute on the market. This authorized operator can of course be either the chip card manufacturer or any subcontractor authorized by the latter or by an accepted private or public authority. Each embedded system is also given an identification number, marked $SN_i$, and within the framework of the implementation of the method that is the subject of the present invention, each embedded system $S_i$ belonging to the given set Lk is therefore equipped with an identification number marked $IDd_j$, constituted by the identifier of the authorized operator $OP_j$ and by the serial number $SN_i$ of this embedded system.

In order to specifically verify the source of the request to certify a public key derived from a set of asymmetric keys, a public key Kp and a private key Ks, generated by an embedded system belonging to the aforementioned set of embedded systems, these public keys Kp and private keys Ks being generated for a given use such as encryption/decryption or digital signature verification/generation for example, the method that is the subject of the present invention consists, prior to any transmission of a certification request, during a step for the configuration of the embedded systems by the operator authorized to perform this configuration, of having this authorized operator generate for the set of embedded systems, in a step 1001, a mother public key KpM and a mother private key KsM designed to be used in connection with a process supported by the algorithm Ca1M relative to the keys KpM and KsM.

The aforementioned step 1001 is followed by a step 1002 that consists of publishing the mother public key KpM associated with the identity of the authorized operator $OP_j$ and with the set Lk of embedded systems. As represented in step 1002 in FIG. 2a, this publication can consist in a publication of four linked values, for example in the form of a list, i.e. of the identifier of the authorized operator $OP_j$, of a range of identifiers defined by the set Lk and of course the value of the mother public key KpM associated with the code indicating the algorithm to be used Ca1M. The range of identifiers can be constituted by a start-of-range identifier and an end-of-range identifier.

During this configuration step performed by the authorized operator, it is indicated that the creation of the keys, the mother public key KpM and the mother private key KsM, is directly dependent on the algorithm used and therefore cannot be described independent of the process supported by the algorithm used. However, the type of algorithm to be used is indicated below.

After the aforementioned step 1002, the method that is the subject of the present invention consists, for each embedded system Si belonging to the set Lk of embedded systems, of calculating, in a step 1003, from the mother private key KsM and the serial number $SN_i$ of each embedded system in question $S_i$, a diversified private key, marked $KsM_i$.

According to a particularly advantageous aspect of the method that is the subject of the present invention, the diversified private key $KsM_i$ is then stored in the externally accessible read/write-protected storage area MAP of the microprocessor card constituting the embedded system.

Generally, it is noted that the diversified private key $KsM_i$ is unique and distinct for each embedded system whose identifier $SN_i$ is different in the set Lk.

After step 1003 mentioned above, an advantageous version of the method that is the subject of present invention consists, prior to any transmission of a certification request for any public key Kp to be certified at the request of each embedded system Si in question, this request of course being formulated by a user Uti, i.e. by an entity, of having the embedded system generate, in a step 1004-5, a certification request RCA specifically containing a public key field CA1,Kp and the usage indicators U of this public key. When the certification request RCA is generated directly by the embedded system, the process can consist of generating the certification request RCA at the embedded system level. The request is then composed of three fields, i.e. a public key algorithm identifier CA1, a public key value Kp and an indicator of the uses of this key U.

In one specific non-limiting embodiment, step 1004-5 can for example consist of communicating, in a step 1004, to the embedded system in question having the identifier $SN_i$, a certification request template marked GRCA, this template containing all of the required fields except the public key fields for decryption or digital signature verification as well as the usage indicators U of the public key Kp that are the subjects of the requested certification.

The verification of the certification request template GRCA will be described in greater detail later in the description.

The certification request template GRCA, in a step 1005, then allows the embedded system in question to perform an operation that consists of filling in the missing fields of the certification request template GRCA. Thus, the public key field, a field that includes the identifier of an encryption/decryption or signature calculation algorithm CA1, for example the aforementioned RSA algorithm, and a public key value Kp that is the subject of the requested certification, as well as the field related to the usage indicators U of this public key, is filled in order to reconstitute a complete certification request, marked RCA, in the next step 1005.

In FIG. 2a, step 1005 is shown to consist of having the embedded system perform the complement of the aforementioned missing fields, the + symbol representing this complementary operation. Generally, it is noted that the aforementioned complementary operation can consist either of assigning appropriate values to dummy values already present in the certification request template GRCA in given fields, or if necessary, of completing this request template by means of concatenation operations using these appropriate values, as will be described later in the description.

The aforementioned step 1004-5 or step 1005 is then followed by a step 1006, which consists of calculating, using the calculation module of the embedded system in question and the diversified key $KsM_i$ associated with this embedded system in step 1003, a cryptographic control value, marked $Sc_i$.

Generally, it is noted that the aforementioned cryptographic control value is calculated on the entire completed request RCA and on the identifier $IDd_i$ of the embedded system in question. It will be recalled that the identifier $IDd_i$ of the embedded system Si is constituted by the identifier $Op_j$ of the authorized operator and by the serial number $SN_i$ of the embedded system.

Preferably, the cryptographic control value $Sc_i$ is a digital signature calculated by means of the diversified private key $KsM_i$.

For this reason, the cryptographic control value verifies the relation:

$$SC_i = S_{KsMi}(RCA, IDd_i)$$

In this relation, it is noted that the subscript KsMi assigned to the signature operation S indicates the calculation of this signature using the diversified private key $KsM_i$ on the arguments RCA and $IDd_i$.

The method that is the subject of the present invention, when a certification request is sent by the embedded system in question to the certification authority, this operation being called "Request by $Ut_i$" in FIG. 2a, then consists of forming, outside the embedded system, in a step 1007, a certification request message, marked MRCA, composed of the request RCA completed by the embedded system in question, the identifier of the embedded system, and the cryptographic control value $Sc_i$ in question.

After the aforementioned step 1007, a step 1008 is provided, which consists of transmitting to the certification authority CA the request message MRCA formed during the preceding step 1007. The message MRCA specifically contains the completed request to certify the public key Kp whose certification is being requested as well as its usage indicators U, this public key Kp and these usage indicators thus being subject to the aforementioned certification request.

The method that is the subject of the present invention then consists, upon reception of the aforementioned certification message MRCA, of having the certification authority perform the operations in step 1009 in order to retrieve the identity of the authorized operator $OP_j$ and the identifier $SN_i$ of the embedded system from the identifier $IDd_i$ of the embedded system, then in step 1010, of retrieving the range of identifiers Lk to which the identifier $SN_i$ belongs from the data published by the operator $OP_j$, then in step 1011, of retrieving from the data of the set Lk the identifier of the process supported by the algorithm to be used CA1M and the value of the mother public key KpM associated with the set Lk.

It is understood, in particular, that in steps 1009, 1010 and 1011, the publication in step 1002 of the linked variables $OP_j$ identifying the authorized operator, Lk identifying the set in question, CA1M identifying the algorithm to be used, and KpM identifying the value of the mother public key associated with this set of embedded systems makes it possible to successively retrieve the identifier of this authorized operator, followed by the value of the public key KpM and the identifier of the algorithm to be used CA1M, for example from the four published linked variables.

After the obtainment by the certification authority of the value of the aforementioned mother public key KpM, a step 1012 is then performed, which consists of verifying, from the value of the mother public key KpM, from the serial number $SN_i$ of the embedded system and from the complete certification request RCA received, the cryptographic control value $Sc_i$. The operation for verifying the cryptographic control value $Sc_i$ verifies the relation:

$$v_{KPM}(S_{KsMi})$$

It is noted that this verification operation consists in a signature verification operation, a dual operation of the signature operation performed in step 1006 for obtaining the cryptographic control value $Sc_i$. Thus, in step 1012, the signature verification operation is performed using the mother public key KpM.

The implementation of the method that is the subject the present invention as described in connection with FIG. 2a thus makes it possible to establish the authenticity of the aforementioned cryptographic control value and the source of the certification request presented to the certification authority.

Under conditions that will be explained later in the description, the verification of this request, the source being established, makes it possible to know for sure, from the aforementioned usage value U, the dedicated usage or usages that can be implemented with the public key Kp, given the usage restrictions on the operations that can be performed using the private key Ks contained in the embedded system. It is then possible to issue a certificate in order to guarantee the use that can be made of this public key given the restrictions on the operations that can be performed using the corresponding private key. This usage guarantee can result from the combined use of two pieces of information that will then be presented in =the certificate generated: the usage indicator of the public key and the security policy identifier. The security policy could indicate that the key generation was performed in an embedded system that has all of the required capabilities for limiting the use of the private keys generated in this embedded system. It could also use any other field for the extension of the certificate as explicitly provided by the X.509 v3 standard.

A variant of implementation of the method that is the subject of the present invention, which makes it possible to verify a certification request template GRCA as described in FIG. 2a, will now be described in connection with FIG. 2b. In FIGS. 2a and 2b, the same steps have the same references.

As may be seen in FIG. 2b, after step 1004, which consists of communicating a certification request template GRCA to the embedded system Si, but prior to step 1005, which consists of having the embedded system Si fill in the missing fields of the certification request template GRCA, the method that is the subject of the present invention can also consist of checking, in a step 1004a, the syntax of the aforementioned certification request template at the level of the embedded system Si in question, in order to make sure that this is actually a certification request. Step 1004a can then be followed by a step 1004b, for example consisting in a step for testing for the true value of the syntax check. In step 1004a, the syntax check is marked V(GRCA) and the testing step 1004b is marked V (GRCA)= true.

Step 1005, which consists of having the embedded system Si fill in the missing fields of the certification request template GRCA, can then be conditioned to a positive verification, i.e. to a positive response to the testing step 1004b mentioned above.

On the other hand, if there is a negative response to the aforementioned step 1004b, a return 1004c to the step for loading the certification request template RCA in step 1004 can hen be provided.

The syntax checking step can be performed by checking the syntax of the certification request template GRCA, the aforementioned checking process possibly depending on the structure of the certification request template used. An example of a syntax checking process will be given later in the description.

Thus, the method that is the subject of the present invention, according to a first aspect, makes it possible to give the usage of the private key Ks to the entity but not to give this entity any knowledge of the value of the private key Ks. In order to prevent any knowledge of the value of the private key, the private key/public key pair is generated by the protected embedded system and the private key is implemented by an algorithm contained directly in the embedded system. It cannot in any case be known outside the embedded system.

According to a second remarkable aspect of the method that is the subject of the invention, in order to verify that the request to certify a public key is actually emanating from the embedded system, the method uses several techniques. In particular, it uses the calculation of a cryptographic control sum, which makes it possible to be sure that the request is in fact emanating from an embedded system customized by the operator Opj. The prior art already uses some of these techniques, which have proven somewhat inflexible, as will be explained below. A first technique consists of placing in each embedded system a secret key from which the cryptographic control sum will be calculated. The major drawback of this known technique is that the secret value of each embedded system must be confidentially communicated to each potential certification authority in advance. A first improvement of this feature consists of using a mother secret and of calculating the secret each embedded system from the serial number of the embedded system and the mother secret. The major drawback in the latter case is that the secret value of each mother secret corresponding to a given set of embedded systems must be confidentially communicated to each potential certification authority in advance.

An original characteristic of the invention, on the other hand, is not to communicate any confidential information in advance, but to make only public information accessible to each potential certification authority, i.e. an identifier of unauthorized operator $OP_j$, a reference of the set Lk, and of course the value of the mother public key KpM associated with an indicator of the algorithm to be used CA1M. This information allows any certification authority to verify the source of the request from any embedded system that belongs to a set of embedded systems.

A more detailed description of the implementation of step 1003 for calculating each diversified private key $KsM_i$ will now be given in connection with FIG. 3, the operating mode of the aforementioned calculation being able to be implemented no matter what the embodiment of the method that is the subject of the invention, as described above in connection with FIG. 2a or FIG. 2b.

The key diversification process implemented in step 1003, as represented in FIG. 3, can thus consist in a process supported by an algorithm known as a Zero Knowledge Signature Mechanisms and the algorithms such as the FIAT-SHAMIR or GUILLOU QUISQUATER algorithms that are usable for this purpose. For this reason, as indicated in FIG. 3, each diversified private key $KsM_i$ is considered to have been obtained by implementing processes supported by the FIAT-SHAMIR algorithm F-S or the GUILLOU-QUISQUATER algorithm G-Q and thus verifies the relation:

$KsM_i$=D-F-S (KsM, $SN_i$)
$KsM_i$=D-G-Q (KsM, $SN_i$)

a relation in which D-F-S and D-G-Q designate the implementation of the key diversification processes supported by the FIAT-SHAMIR and GUILLOU-QUISQUATER algorithms, respectively.

The technique used consists of placing in each embedded system a diversified private key calculated from the serial number of the embedded system and from a mother private key, which diversified key will be used to calculate the cryptographic control sum. The Certification Authority CA will then be able to verify the exactitude of the cryptographic control sum thus calculated by implementing the algorithm CA1M corresponding to the type of algorithm used using only the serial number of the embedded system and the mother public key corresponding to the set Lk to which the embedded system belongs.

Because of thus, it is not necessary to know in advance which Certification Authority will be chosen by the entity, since each Certification Authority will be capable, particularly after the reception of the certificate request, of obtaining the mother public key corresponding to the set to which the embedded system belongs. The management of a large number of embedded systems, for example several million, is therefore greatly simplified, thus allowing wide dissemination of such cryptographic systems, in strict conformity with the national legislative provisions authorizing their use.

Various elements describing the structure of the messages or data used to implement the method that is the subject of the present invention will now be given in connection with FIGS. 4a through 4c.

Figure 4A:
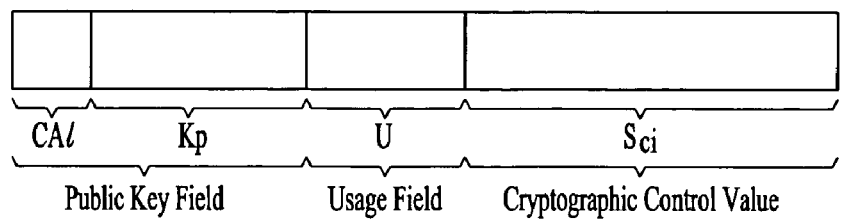

FIG. 4a represents a simplified version of the structure of a certification request message. In this simplified embodiment, the embedded system generates all of the fields of the request RCA by concatenating the following information: the public key field that comprises the identifier of the algorithm used CA1, the value of the public key Kp, and a key usage field U, which are the subjects of the requested certification. These fields can, for example, be subjected to a coding in accordance with the standard ASN1, for Abstract Syntax Notation 1, in order to be able to delimit the size of each field and to be sure of the nature of each field. Finally, the cryptographic control value $Sc_i$ is calculated on the preceding information, then added to the preceding information.

In this simplified embodiment, all of the aforementioned fields allow the implementation of the method that is the subject of the present invention, for example as represented in FIG. 2.

Figure 4B:
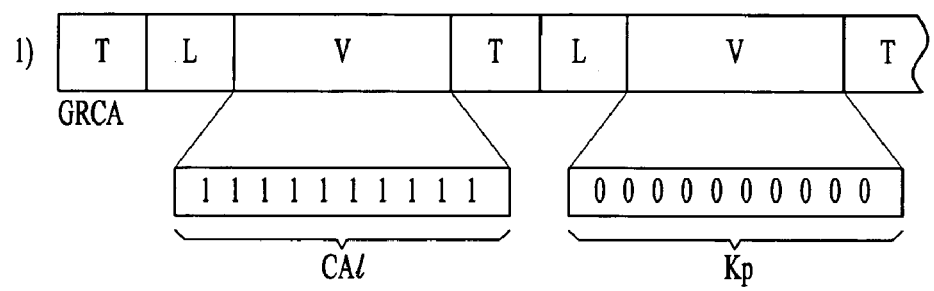
FIG. 4b represents, by way of a non-limiting example, the structure of a certification request message in an improved version, coded in the ASN1 format in a TLV structure, more specifically adapted to the implementation of the method is the subject of the invention as represented in FIG. 2b.
Figure 4B:
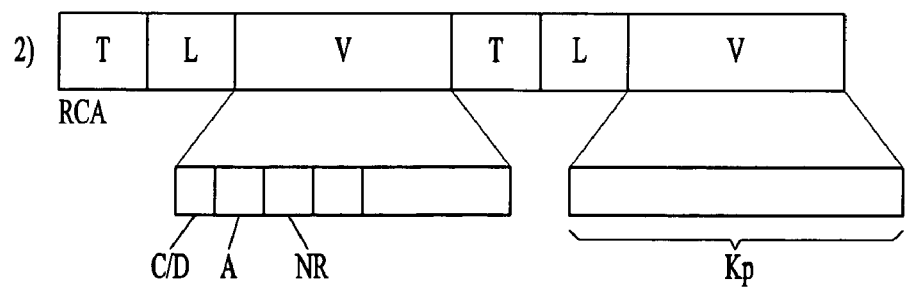

FIG. 4b represents a structure of a completed request message, for example in a format in accordance with the aforementioned ASN1 coding. In this case, the coding of these messages is performed in accordance with the socalled TLV mode, in with T designates the type of the field, L the length of the latter and V the value of the field.

FIG. 4b, at point 1), represents the structure of a certification request template GRCA is such a case, which is considered to be formed by a set of fields TLV that are sequential or interleaved in accordance with ASN1 standard. This request template is formed outside the embedded system. It must include, and this is verified by the embedded system, three fields and three fields only, which correspond to: 1) a type of algorithm identifying field, 2) a type of public key value field, 3) a type of public key usage indicator field. The position of each of these fields among the other field of the request template must also correspond to a precise position, i.e. it must be preceded and followed by predetermined different types of fields.

Under these conditions, beginning with the aforementioned certification request template to GRCA, the syntax check represented in step 1004b of FIG. 2b can consist of verifying the value of the type of the first field, then based on this type or on the length of this field, moving with on to the next type. When moving on, it is appropriate to store all of the various types found, then verify that the three types of fields required are located in the positions where they should be placed. For each of the three fields, it is then appropriate to verify their length, as well as the value of the field CA1. In essence, this means verifying that the required algorithm type actually corresponds to the type of key generated corresponding to this algorithm. For the fields formed outside the embedded system, which must definitely contain the value of the public key Kp and the value of the usage indicator U of the key, these two values can contain any value, the values 0 or 1 as represented in FIG. 4b, since the embedded system will replace them with the appropriate internally generated values.

After the recognition of the true value of the verification thus performed, a verification marked V(GRCA) in step 1004a of FIG. 2b, the values of the two fields can be replaced by the values generated by the embedded system. The usage field U substituted can consist of a bit string, the first bit representing for example an encryption/decryption usage C/D, the value 1 indicating encryption and the value 0 a lack of encryption, the second bit corresponding for example to a digital signature or authentication usage A, the third bit corresponding for example to a non-repudiation operation NR using a digital signature, for example.

The value of the public key Kp can be replaced by bit values of this corresponding key.

Figure 4C:
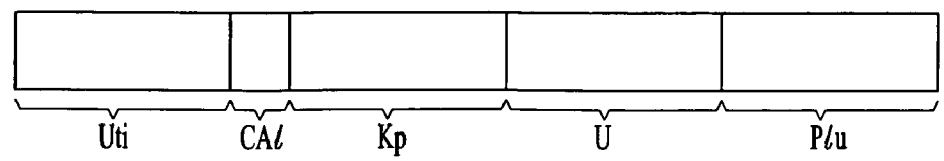
FIG. 4c represents, by way of non-limiting example, the structure of the certification request template GRCA.

Finally, in reference to FIG. 4c, the structure of the certification request template GRCA, loaded on the initiative of the user Uti, can include a field related to an identifier of this user Uti, a field related to the value of the key Kp, a public key whose certification is requested by the user, a field related to the usage or usages of this key U and a field Plu related to the ranges of the validity or utilization of the aforementioned key Kp.

More specifically, it is noted that the field related to the identifier of the user Uti is filled in by the user at the time of his certification request, while the fields related to the value of the key Kp and the field related to the uses of this key are filled in by the embedded system itself.

The field related to the identifier of the user Uti can correspond to the serial number $SN_i$ of the embedded system itself.

A more detailed description of the implementation of step 1012, which consists of having the certification authority verify the certification request message MRCA and in particular the cryptographic control value $Sc_i$, will be described in connection with FIG. 5.

Generally, it is noted that each verification step is performed using a signature verification process, particularly for verifying the cryptographic control value $Sc_i$, which is none other than a signature obtained from the diversified private key $KsM_i$ in step 1006, described previously in the description. Under these conditions, the verification operation $\upsilon_{KpM}$ consists in the dual operation of the one performed in the aforementioned step 1006.

As shown in FIG. 5, the input variables are, in addition to the mother public key KpM that was retrieved following the execution of steps 1009, 1010 and 1011 of FIG. 2a or 2b, the cryptographic control value $Sc_i$ and the certification request message MRCA as well as the identifier $IDd_i$ of the embedded system, i.e. the identifier of the operator $OP_j$ and the serial number $SN_i$ of the embedded system in question. The aforementioned dual verification operation of the signature operation with the aforementioned input variables as parameters then allows, a yes or no response, i.e. the establishment of the true value or of the value complemented by this true value, considered to be false value, of the verification operation.

While the source of the certification request is thus able to be verified in accordance with the implementation of the method that is the subject of the present invention, as represented in FIG. 2a and/or 2b, the aforementioned method also makes it possible to modulate the strength of the cryptographic operations, i.e. the encryption/decryption and signature calculation/verification operations assigned to each embedded system Si in question.

Thus, according to a particularly remarkable aspect of the method that is the subject of the present invention, it makes it possible, as a result of the requested certification of a given public key and the uses of this public key, either to accredit the embedded system Si requesting this certification for performing decryption operations in accordance with a process supported by a weak algorithm, or to accredit this embedded system or the entity in possession of this embedded system only for operations supported by an algorithm limited to just signature calculation operations.

It is understood, in particular, that as a function of the value of the bits of the usage field of the key in question, a usage value coded for example in 2 bits, the value 1X of which 2 bits could correspond to a decryption usage in accordance with a process supported by a weak algorithm and the value X1 could correspond to an operation in accordance with a process supported by a signature generation algorithm only, the accredited embedded system could perform either of these operations or even both operations, but not any other operations such as strong decryption. It is also noted that the same embedded system could comprise several keys, some of these comprising for example the usage bits with the value 10, thus limiting their usage to weak decryption purposes, and others with the value 01 thus limiting their usage to signature generation purposes.

A decryption process supported by a weak algorithm according to the subject of the present invention will now be described in connection with FIG. 6.

Generally, it is noted that an encryption or decryption key used by the RSA algorithm, an asymmetric key, generally comprises 512 or more bits, while a symmetric key generally includes from 40 to 192 bits. It is therefore necessary to fill in the remaining bits, for example with a header. It is possible, for example, in the string of 512 bits thus created, to provide a header constituted by specific arbitrary dummy values, the values 02, 00 and in hexadecimal code FFF followed by two bytes with the value 00 on the entire value of the header with which a symmetric secret key, right-aligned, is concatenated, all of which constitutes a bit string of 512 bits. In the case where the symmetric secret key KSF comprises 64 or more bits, the symmetric secret key decryption process is considered to be strong, and does not correspond to the subject of the present invention in this embodiment.

On the other hand, when the symmetric secret key field KSf is less than or equal to 40 bits, the header field accordingly being completed, for example, by hexadecimal values FFF followed by a predetermined number of 00s, the secret key field is a field of a symmetric weak decryption key and thus corresponds to a weak decryption function capable of being implemented according to the method that is the subject of the present invention.

In such a case, according to a particularly remarkable aspect of the method that is the subject of the invention, for a set of asymmetric keys, a public encryption key marked Ep and a private decryption key marked Ds generated by the embedded system Si, the encryption key Ep corresponding to the public key Kp whose certification has been requested as mentioned previously in the description, and the private decryption key Ds corresponding to the private key Ks mentioned previously in the description, the method that is the subject of the invention consists of associating with the decryption key Ds and with the corresponding asymmetric decryption process supported for example by the RSA algorithm, a weak decryption process and key supported for example by the DES algorithm and whose symmetric key has a length less than or equal to 40 bits. Thus, referring to FIG. 6, it is noted that the weak symmetric secret key, marked KSf, completed by its header of arbitrary value as mentioned previously in the description, is subjected to an encryption process in order to obtain an encrypted key from the public asymmetric encryption key Ep. The encrypted key thus obtained is then subjected to a decryption process by means of the private asymmetric decryption key Ds while, according to the method that is the subject of the present invention, this private decryption key Ds is stored in the externally accessible read/write-protected storage area of the embedded system and is therefore unknown to the user. The aforementioned decryption process therefore makes it possible to obtain a decrypted key whose structure is none other than the header mentioned previously in the description and the weak symmetric key KSf whose length is determinant.

If the length of the weak symmetric key KSf is less than or equal to 40 bits, the header being distinguished simply by referring to the corresponding header values, and the symmetric key and in particular the weak symmetric key KSf consequently also being distinguished, this weak symmetric key KSf can then be made available to the entity possessing the embedded system for decryption operations in accordance with a process supported by a weak algorithm. Under these conditions, the symmetric weak decryption key KSf only allows the latter to decrypt cryptograms C into messages M using a weak decryption algorithm as represented in FIG. 6.

If, on the other hand, the length of the bit string representing the symmetric key except for the aforementioned header is greater than 40 bits, the symmetric key, whose length is greater than 40 bits, is not made available to the entity possessing the embedded system, which is therefore incapable of performing decryption operations in accordance with a process supported by a strong algorithm.

Figure 7:
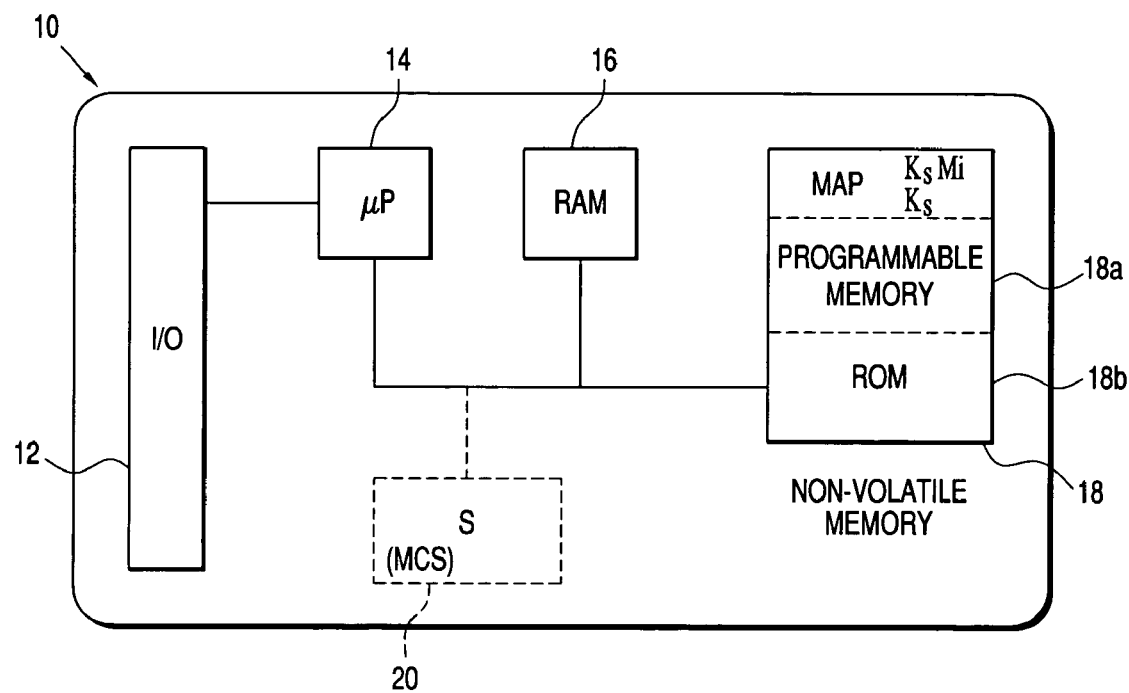
FIG. 7 represents an embedded system that makes it possible to implement the method that is the subject of the invention.

An embedded system that makes it possible, in particular, to implement the method that is the subject of the present invention will now be described in connection with FIG. 7. In a non-limiting way, this embedded system is represented and described in the form of a microprocessor card.

Referring to the aforementioned FIG. 7, the embedded system comprises, in a conventional way, the same elements as those described in connection with FIG. 1, i.e. a portable card 10 having a chip on-board therein and comprising a calculation unit 14, a RAM 16, a nonvolatile memory 18 comprising a programmable memory 18a comprising an externally accessible protected storage area MAP, a cryptographic calculation module 20 and an input/output system 12 connected by a link of the BUS type. In order to implement the method that is the subject of the present invention, this embedded system comprises at least a diversified key $KsM_i$ stored in the externally accessible protected memory MAP. This diversified private key is unique and distinct for this embedded system. It is calculated from a mother private key KsM and an identification number of this embedded system and is associated with a mother public key KpM.

The cryptographic module 20 comprises a module MCS for calculating a signature from the diversified private key $KsM_i$, making it possible to calculate the signature of a request to certify a public key Kp associated with a private encryption key Ks, or signature key, respectively. The private key Ks is generated by the signature calculation module MCS and stored in the protected memory MAP. The signature of a certification request is a function of the identification number of this embedded system. The signature calculation module MCS makes it possible to transmit to a certification authority a certification request message comprising this certification request and the aforementioned signature. This allows the certification authority to verify the source of the certification request from this embedded system 10 and the protection of the diversified private key $KsM_i$ and private signature key Ks in the externally accessible protected memory MAP using only public elements, such as the mother public key KpM. The signature calculation module MCS, can be installed in a ROM part 18b of the nonvolatile memory 18 and called upon request by the cryptographic calculation module 20.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A method for verifying the usage of public keys of a set of asymmetric keys, a public key (Kp) and private key (Ks) generated for a given use, such as encryption/decryption or digital signature verification/generation, by an on-board system and stored in the storage area of the on-board system ($S_i$) equipped with cryptographic calculation means and externally accessible read/write-protected means for storing digital data, said digital data ($IDd_i$) comprising at least a serial number ($SN_i$) for identifying the on-board system and an identification code ($Op_j$) of an operator authorized to configure said on-board system, a request being formulated by said on-board system by transmitting a request message (MRCA) containing said public key (Kp) to a certification authority (CA), comprising:

PRIOR TO ANY TRANSMISSION OF A CERTIFICATION REQUEST, DURING THE CONFIGURATION OF A SET (Lk) OF ON-BOARD SYSTEMS ($S_i$) BY THE AUTHORIZED OPERATOR:

generating by the authorized operator, for said set of on-board systems, a mother public key (KpM) and a mother private key (KsM) used in connection with a process supported by an algorithm (CA1M);

publishing said mother public key (KpM) associated with the algorithm (CA1M), the identification code of said authorized operator ($OP_j$), and defining a range of on-board system identifiers for the set (Lk) of on-board systems;

calculating, for each on-board system of said set (Lk) of on-board systems, from said mother private key (KsM) and from the serial number ($SN_i$) of the on-board system, a diversified private key ($KsM_i$), and storing said diversified private key (KsMi) in said externally accessible, read/write-protected storage area, and;

PRIOR TO ANY TRANSMISSION OF A CERTIFICATION REQUEST MESSAGE:

generating by the on-board system a certification request (RCA) containing, in particular, a field of the public key (Kp) and usage indicators (U) of said public key, using said calculation means and said diversified key (KsMi) associated with this on-board system to calculate a cryptographic control value ($Sc_i$) on the entire request (RCA), said cryptographic control value being a digital signature calculated by means of the diversified private key ($KsM_i$);

WHEN A CERTIFICATION REQUEST IS SENT TO THE CERTIFICATION AUTHORITY BY THE ON-BOARD SYSTEM:

forming a certification request message (MRCA) containing the request (RCA), the identifier ($IDd_i$) of the on-board system, the request message being constituted by the identification code ($OP_j$) of this authorized operator and by the serial number ($SN_i$) of the on-board system, and a cryptographic control value ($Sc_i$);

transmitting to the certification authority (CA) said request message (MRCA) formed during the preceding phase and containing the pubic key (Kp) and the usage indicators (U) subject to said certification, and said cryptographic control value ($Sc_i$); and WHEN A CERTIFICATION REQUEST MESSAGE (MRCA) IS RECEIVED BY THE CERTIFICATION AUTHORITY:

retrieving the identification code of the authorized operator ($OP_j$) from the digital data ($IDd_i$) of the on-board system, retrieving from said identification code ($OP_j$) of said authorized operator, the value of the mother public key (KpM) as well as the identifier of the algorithm (CA1M) associated with the set (Lk) of the on-board system, verifying from said mother public key (KPM), from said serial number ($SN_i$) of the on-board system, and from said certification request message (MRCA) received, said cryptographic control value (Sci), and establishing the authenticity of said cryptographic control value and the source of this certification request.

2. A method according to claim 1, characterized in that when the certification request (RCA) is generated by the on-board system, the method further comprises generating, at the on-board system level, a certificate request (RCA), composed of three fields, indicating a public key algorithm identifier (CA1), a public key value (kP), and an indicator of the usage of said key (U).

3. A method according to claim 1, characterized in that when the certification request is completed by the on-board system, the method further comprises the step of communicating a certification request template (GRCA) to said on-board system;

checking at the on-board system level, the syntax of the certification request template (GRCA) to ensure that it is a correctly formed certification request, and conditioning a step consisting of having the on-board system fill in missing fields of the certification request template (GRCA) to a positive verification.

4. A method according to claim 1, characterized in that, for a set of asymmetric signature keys (Kp), (Ks) generated by said on-board system, allowing use of the private key (Ks) under control of the cryptographic calculation means only for signature generation purposes, said private key (Ks) stored in said externally accessible read/write-protected storage area being unknown to the user and limited to a utilization exclusively for digital signature purposes, the utilization of said key being limited to signature purposes and the utilization of the certificate containing the corresponding public key being limited to signature verification purposes.

5. A method according to claim 1, characterized in that for a set of asymmetric keys, a public asymmetric encryption key (Ep) and a private asymmetric decryption key (Ds) generated by said on-board system, the method consists of associating with said encryption and decryption keys (Ep), (Ds) and with the asymmetric decryption process, a symmetric "weak" decryption process and key, the symmetric decryption key being encrypted, then decrypted, by means of the private asymmetric decryption key (Ds), and private key (Ds) stored in said externally accessible read/write protected storage area being unknown to the user, so as to authorize the utilization of said key only for weak decryption purposes, the utilization of the certificate containing the corresponding public key being limited to said weak encryption purposes.

6. An on-board system comprising a card having a microprocessor, a RAM, a nonvolatile memory including programmable memory and an externally accessible protected storage area memory, a cryptographic calculation module and an input/output system connected by a link of the BUS type, a diversified private key $KsM_i$ stored in said externally accessible protected memory, said diversified private key, being unique and distinct for said on-board system and calculated from a mother private key KsM and an identification number of said on-board system, and being further associated with mother public key KpM;

said cryptographic calculation module comprising:

means for calculating a signature from said diversified private key $KsM_i$, making it possible to calculate the signature of a certification request to certify a public key Kp associated with a private encryption key Ks or signature key, respectively, said private key Ks generated by said signature calculation means being stored in said externally accessible protected memory, said signature of the certification request being a function of the identification number of said on-board system and an identification code of an authorized operator, said signature calculation means making it possible to transmit to a certification authority a certification request message containing said certification request and said signature, which allows said certification authority to verify the source of the certification request from said on-board system and the protection of said diversified private key and private signature key in said externally accessible protected memory using only public elements, such as said mother public key KpM.

\* \* \* \* \*